United States Patent
Haglund

[11] Patent Number: 5,868,900
[45] Date of Patent: Feb. 9, 1999

[54] TOOL FOR FIXATION OF CABLE OR LINE

[75] Inventor: Finn Agnar Haglund, Oslo, Norway

[73] Assignee: Roller International ASA, Norway

[21] Appl. No.: 682,617

[22] PCT Filed: Jan. 25, 1995

[86] PCT No.: PCT/NO95/00018

§ 371 Date: Jul. 25, 1996

§ 102(e) Date: Jul. 25, 1996

[87] PCT Pub. No.: WO95/20834

PCT Pub. Date: Aug. 3, 1995

[30] Foreign Application Priority Data

Jan. 26, 1994 [NO] Norway ..................................... 940280

[51] Int. Cl.⁶ .................................................. B32B 31/00
[52] U.S. Cl. ........................... 156/579; 156/391; 156/582
[58] Field of Search ..................... 156/579, 391, 156/582, 577, DIG. 42

[56] References Cited

U.S. PATENT DOCUMENTS

| | | | |
|---|---|---|---|
| 1,636,432 | 7/1927 | Partridge | 156/DIG. 42 |
| 3,089,535 | 5/1963 | Vohrer et al. | 156/582 X |
| 3,253,085 | 5/1966 | Stern . | |
| 3,736,199 | 5/1973 | Mason | 156/582 X |
| 4,459,165 | 7/1984 | Meis et al. | 156/579 X |
| 4,608,116 | 8/1986 | Braselton | 156/579 X |
| 5,045,146 | 9/1991 | Rundo | 156/391 |
| 5,316,614 | 5/1994 | Phillips | 156/391 X |
| 5,328,543 | 7/1994 | Campagna et al. | 156/579 X |
| 5,462,633 | 10/1995 | Manusch et al. | 156/579 X |

Primary Examiner—James Engel
Attorney, Agent, or Firm—Sterne, Kessler, Goldstein & Fox P.L.L.C.

[57] ABSTRACT

A tool for the fixation of a cable or line on a support by adherence means, the tool comprising a pressure wheel for guiding movement on and along said cable or line when mounted on a handle. The circumference of the pressure wheel is adapted to the form and dimensions of the cable or line in such a way that a predetermined pressure for adhesive fixation is applied with said guided movement. The circumference of the pressure wheel suitably comprises a cylindric groove track delimited on each side by a flange for contact against the support when applying pressure for adhesive fixation during the guided movement on and along the cable or line. The circumference of the pressure wheel may also comprise a frustoconically shaped groove track delimited at its narrower side by a flange to be in contact with the support and at its wider side by a transverse surface to be supported against a wall surface during the application of pressure for adhesive fixation during the guided movement on and along the cable or line. Preferably the tool is implemented for exchange of the pressure wheel in order to adapt different pressure wheels to different lines and cables.

6 Claims, 1 Drawing Sheet

Fig.1
Fig.2
Fig.3
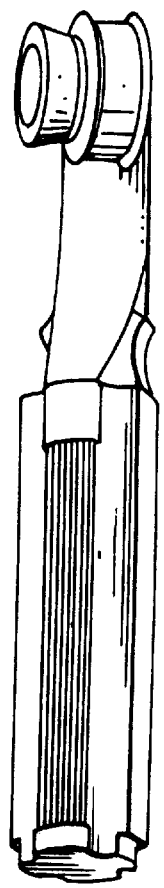
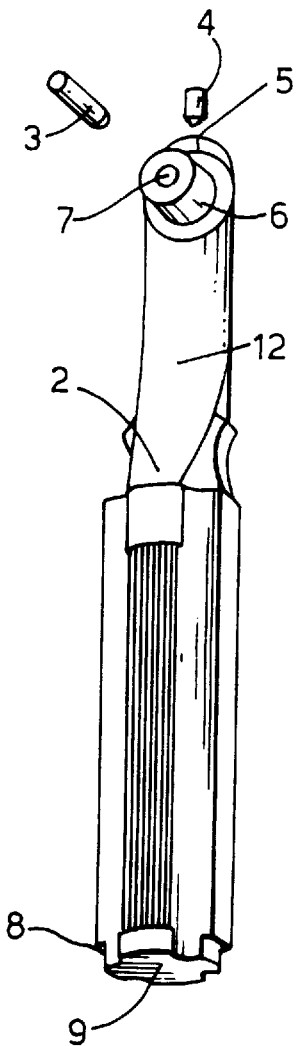
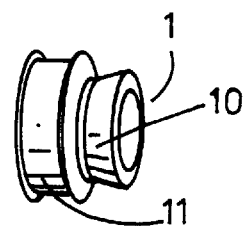

TOOL FOR FIXATION OF CABLE OR LINE

The present invention relates to a tool for the fixation of a cable or a line on a support.

Lately it has been developed many new types of cables and lines both for power supply and information transmission. Oval and flat cable types having varying external diameters and being implemented with new types of materials both as to insulation and conductors (e.g. light conductors) as well as lower weight, have appeared in addition to the traditional types. Also, new quality standards before and after mounting have lately been introduced.

Traditional tools for the fixation of cable and line are apt to cause damage on the protective coating or squize together the isolation materials between the conductors, as great force must be applied to the impact tool for fixation of the retaining means to the support. Also, the supports for fixation may comprise different and newer types of material than earlier. On this background new fixation means has been developed, as for instant staples, castor clamps, adhesives on the support or the cable/line, or adhesive tapes.

In German patent No. 827 372 issued to Dr.Ing. Alfred Bush in 1952 it is described a tool for preliminary fixation of cable or line with applied adhesive as fixation means. This tool is, however, purely a guidance tool for guiding the cable from a cable drum to the fixation support before the cable is stapled in cable channels or cable buffers. The tool is provided with a guide wheel which has a half-rounded groove for the cable in the center and guide tracks on both sides. Further, the tool comprises a grip handle, on which the guide wheel is mounted by means of a through bolt in a holding fork and locked by means of a pair of splints through the wheel shaft. The central groove of the guide wheel are also centered against the cable drum, which make the guide wheel dependant of the motional parth of the drum. The pressure applied by the guide wheel to the line or cable in question is dependant of the obliqueness of the handle, and in order to achieve the required pressure, it would be necessary to grip the handle with both hands.

The tool according to said German patent is developed only for cable types having a sheath of iron or other metals. This tool is hardly suitable for the mounting of cables or lines of modern types.

It is then an object of the present invention to provide an improved tool for the fixation of a cable or a line to a support by means of adhesive, said tool being well suited for use on lines and cables of modern types in order to achieve permanent mounting of these.

Thus, the invention is related to a tool for fixation of cable or line on a support by means of adhesive, the tool comprising a pressure wheel for guided movement on and along said cable or line when mounted on a handle.

On this background of prior art, the characterizing feature of the tool according to the invention is that the circumference of the pressure wheel is adapted to the form and dimensions of the cable and line in such a way that a predetermined pressure for adhesive fixation is applied with that guided movement.

For adhesive fixation of the cable or line on a free horizontal or vertical support, the circumference of the pressure wheel comprises a cylindric groove track 11 delimited by flanges to be in contact with the support when applying pressure for adhesive fixation.

For fixation of a line or a cable along a wall corner, the circumference of the pressure wheel preferably comprises a frustoconically shaped groove track 10 delimited at its narrower side by a flange to be in contact with the support, and at its wider side by a transverse surface to be supported against a wall surface during the application of pressure for adhesive fixation.

Preferably the tool is implemented in such a way that the pressure wheel is exchangeable, in order that the tool may be used for mounting of various lines or cables having different form and dimensions by utilizing different available pressure wheels. The pressure wheel is then suitably adapted to be connected with an anchor pin having an associated snap lock at one end, the handle being provided with an internally threaded fixation hole for the insertion of a screw for the snap lock.

The tool according to the invention will now be described in more details with reference to the accompanying drawing, on which:

FIG. 1 shows the tool seen obliquely from the side,

FIG. 2 shows the tool handle seen from the front side with the pressure wheel removed, and FIG. 3 shows the pressure wheel demounted from the handle.

As shown in FIG. 2 the pressure wheel 1 is mounted on the tool handle 2 by means of an anchor pin 3. The anchor pin 3 is maintained on the handle by means of a snap lock 4, the handle 2 being provided with a threaded hole 5 for receiving the snap lock screw 4. For receiving the pressure wheel the tool handle 2 is provided with a guide spindle 6 with a bore 7 for guiding the anchor pin 3 to the snap lock 4, at which the anchor pin 3 is shaped with a round-threaded groove at the snap end for engaging the snap screw 4.

Further, the tool handle 2 is provided with fixation grooves for engaging an extension rod. Also, the handle is produced with an impact surface 9 for impact tools, and formed with a convex curve 12 tapering towards the handle end for the mounting of the pressure wheel 1.

As shown in FIG. 3, the circumference of the pressure wheel 1 is formed with a cylindric groove track 11 delimited on both sides by a flange to be in contact with the support when pressure is to be applied on a line for adhesive fixation. Furthermore the pressure wheel 1 is also provided with a frustoconically shaped groove track 10, which at its narrower end is delimited by a flange to be in contact with the support and at its wider end by a transverse surface to be supported against a wall surface, when pressure is to be applied to a line for adhesive fixation along a wall corner.

In case a line is to be adhered to the support by means of a tool according to the invention, adhesive is first applied to the line and/or the support. Thereafter the line is placed with adherent contact against the support, and a correspondingly adapted groove track 10 or 11 on the pressure wheel 1 of the tool is pressed against and guided along the line to achieve a secure adhesive fixation on the support.

With a preferred embodiment a suitable double sided adhesive tape is first applied to the support at the mounting area. After removing the cover sheet at the top side of the adhesive tape, said line or cable is placed at the uncovered adhesive surface and pressed against the same for good adhesive fixation by means of the tool according to the invention, as described above.

I claim:

1. Tool for fixation of a cable or line on a support through use of an adhesive, said tool comprising:
   a handle;
   a pressure wheel mounted on said handle for guided movement on and along the cable or line, said pressure wheel having a cylindric groove track delimited by flanges;
   an anchor pin for mounting said pressure wheel on said handle; and a snap lock at one end of said anchor pin.

2. Tool as claimed in claim 1, wherein said handle comprises an internally threaded fixation hole for the insertion of said snap lock.

3. Tool as claimed in claim 1, wherein said handle comprises a guide spindle having a through passage for the guidance of said anchor pin to said snap lock.

4. Tool for fixation of a cable or line on a support through use of an adhesive, said tool comprising:

- a handle;
- a pressure wheel mounted on said handle for guided movement on and along the cable or line, said pressure wheel having a frustoconically shaped groove track delimited at its narrower side by a flange to be in contact with the support and at its wider side by a transverse surface to be supported against a wall surface during said guided movement on and along the cable or line;
- an anchor pin for mounting said pressure wheel on said handle; and
- a snap lock inserted at one end of said anchor pin.

5. Tool as claimed in claim 4, wherein said handle comprises an internally threaded fixation hole for the insertion of said snap lock.

6. Tool as claimed in claim 4, wherein said handle comprises a guide spindle having a through passage for the guidance of said anchor pin to said snap lock.

* * * * *